(12) United States Patent
Kim et al.

(10) Patent No.: US 10,390,254 B2
(45) Date of Patent: Aug. 20, 2019

(54) INTERFERENCE CANCELLATION METHOD AND APPARATUS BETWEEN TERMINALS IN WIRELESS ACCESS SYSTEM SUPPORTING FULL-DUPLEX RADIO SCHEME

(71) Applicant: LG ELECTRONICS INC., Seoul (KR)

(72) Inventors: Jinmin Kim, Seoul (KR); Jaehoon Chung, Seoul (KR); Kitae Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/028,255

(22) PCT Filed: Oct. 10, 2014

(86) PCT No.: PCT/KR2014/009523
§ 371 (c)(1),
(2) Date: Apr. 8, 2016

(87) PCT Pub. No.: WO2015/053583
PCT Pub. Date: Apr. 16, 2015

(65) Prior Publication Data
US 2016/0249245 A1 Aug. 25, 2016

Related U.S. Application Data

(60) Provisional application No. 61/889,040, filed on Oct. 10, 2013.

(51) Int. Cl.
*H04W 28/02* (2009.01)
*H04B 17/345* (2015.01)
(Continued)

(52) U.S. Cl.
CPC ...... *H04W 28/0236* (2013.01); *H04B 17/345* (2015.01); *H04L 5/16* (2013.01); *H04W 72/042* (2013.01); *H04W 72/0413* (2013.01)

(58) Field of Classification Search
None
See application file for complete search history.

(56) References Cited

U.S. PATENT DOCUMENTS

2009/0147706 A1* 6/2009 Yu ............... H04B 7/15542
370/277
2010/0080323 A1* 4/2010 Mueck ............ H04J 11/0033
375/296
(Continued)

FOREIGN PATENT DOCUMENTS

CN 102970256 A 3/2013
KR 10-2009-0052773 A 5/2009
(Continued)

*Primary Examiner* — Yemane Mesfin
*Assistant Examiner* — Jeff Banthrongsack
(74) *Attorney, Agent, or Firm* — Birch, Stewart, Kolasch & Birch, LLP

(57) ABSTRACT

The present invention relates to methods for interference cancellation between terminals in a full-duplex radio (FDR) system and apparatuses supporting the same. A method for cancelling interference between terminals in a wireless access system supporting a full-duplex radio (FDR) system, as an aspect of the present invention, may comprise the steps of: receiving, by a first terminal, reference signal information including information for configuring an interference reference signal from a base station; receiving the interference reference signal from a second terminal; obtaining, by the first terminal, interference channel information with regard to an interference channel between the first terminal and the second terminal on the basis of the interference reference signal; and transmitting by beamforming uplink data to the base station on the basis of the interference (Continued)

channel information by the first terminal. In this case, the first terminal is supported by the FDR system and the second terminal supports the half-duplex radio (HDR) system, and a resource area transmitting uplink data by the first terminal can be configured to match a resource area receiving downlink data by the second terminal.

12 Claims, 16 Drawing Sheets

(51) Int. Cl.
*H04L 5/16* (2006.01)
*H04W 72/04* (2009.01)

(56) References Cited

U.S. PATENT DOCUMENTS

| | | |
|---|---|---|
| 2010/0111018 A1 | 5/2010 | Chang |
| 2012/0063369 A1* | 3/2012 | Lin ............ H04B 7/15542 370/279 |
| 2013/0023285 A1 | 1/2013 | Markhovsky et al. |
| 2013/0252621 A1 | 9/2013 | Dimou et al. |
| 2014/0185540 A1* | 7/2014 | Gaal ............ H04L 1/1867 370/329 |

FOREIGN PATENT DOCUMENTS

| | | |
|---|---|---|
| KR | 10-2010-0045391 A | 5/2010 |
| KR | 10-2012-0082315 A | 7/2012 |
| KR | 10-2013-0055685 A | 5/2013 |

\* cited by examiner

INTERFERENCE CANCELLATION METHOD AND APPARATUS BETWEEN TERMINALS IN WIRELESS ACCESS SYSTEM SUPPORTING FULL-DUPLEX RADIO SCHEME

CROSS REFERENCE TO RELATED APPLICATIONS

This application is the National Phase of PCT International Application No. PCT/KR2014/009523, filed on Oct. 10, 2014, which claims priority under 35 U.S.C. 119(e) to U.S. Provisional Application No. 61/889,040, filed on Oct. 10, 2013, all of which are hereby expressly incorporated by reference into the present application.

TECHNICAL FIELD

The present invention relates to methods and apparatus for cancelling interference between user equipments in a full duplex radio (FDR) system which is one of wireless access systems.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

That is, in legacy wireless access systems, a Base Station (BS) or a UE performs communication using a Half Duplex Radio (HDR) system of a Frequency Division Duplex (FDD) system for transmitting signals on a wireless resource divided based on frequency or a Time Division Duplex (TDD) system for transmitting signals on a wireless resource divided based on time.

However, in the HDR communication system, the UE and/or the BS are incapable of simultaneously performing reception and transmission in the same frequency/time resource. Therefore, introduction of an FDR communication system has been proposed to efficiently use resources. The FDR communication system refers to a system in which the BS and/or the UE simultaneously transmit and receive different signals in the same frequency/time resource zone.

Notably, since the BS and/or the UE simultaneously perform data transmission and reception through the same resource zone in a communication environment of the FDR system, self-interference in which a signal transmitted by the BS or the UE is received through a reception antenna of the BS or the UE occurs. In addition, mutual interference may occur when both an FDR zone and an HDR zone are configured together.

Accordingly, the methods for measuring self-interference channels are needed to reduce self-interference in a wireless access system supporting FDR system.

DISCLOSURE

Technical Problem

An object of the present invention is to provide a method for reliable communication.

Another object of the present invention is to provide methods for estimating interference between user equipments in an FDR system.

Still another object of the present invention is to provide methods for cancelling interference between user equipments in an FDR system.

Further still another object of the present invention is to provide apparatuses for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to methods and apparatus for cancelling interference between user equipments in a full duplex radio (FDR) system.

In one aspect of the present invention, a method for cancelling interference between UEs in a wireless access system supporting a full-duplex radio (FDR) system comprises the steps of receiving, by a first UE, reference signal information, which includes information for configuring an interference reference signal, from a base station; receiving the interference reference signal from a second UE; acquiring, by the first UE, interference channel information on an interference channel between the first UE and the second UE on the basis of the interference reference signal; and transmitting, by the first UE, uplink data to the base station on the basis of the interference channel information by performing beamforming for the uplink data. In this case, both the first UE and the second UE may support the FDR system, or the first UE supports the FDR system while the second UE supports a half-duplex radio (HDR) system, and a resource region where the first UE transmits the uplink data may be configured to correspond to a resource region where the second UE receives downlink data. Alternatively, both the first UE and the second UE may support the HDR system, which may be a system supporting different link modes (uplink/downlink) at the same time.

In another aspect of the present invention, a first UE for supporting cancellation of interference between UEs in a wireless access system supporting a full-duplex radio (FDR) system comprises a transmitter; a receiver; and a processor for supporting cancellation of interference between UEs by controlling the transmitter and the receiver. In this case, the processor is configured to receive reference signal information, which includes information for configuring an interference reference signal, from a base station by controlling the receiver, receive the interference reference signal from a second UE by controlling the receiver, acquire interference channel information on an interference channel between the first UE and the second UE on the basis of the interference reference signal and transmit uplink data to the base station on the basis of the interference channel information by performing beamforming for the uplink data by controlling the transmitter, wherein both the first UE and the second UE may support the FDR system, or the first UE supports the FDR system while the second UE supports a half-duplex radio (HDR) system, and a resource region where the first UE transmits the uplink data may be configured to correspond to a resource region where the second UE receives downlink data. Alternatively, both the first UE and the second UE may support the HDR system, which may be a system supporting different link modes (uplink/downlink) at the same time.

The reference signal information may include at least one of type information of the interference reference signal, timing information when the interference reference signal is transmitted, and resource region information on a frequency domain to which the interference reference signal is transmitted.

The first UE may transmit the uplink data by performing null space projection on the basis of the interference channel information.

The interference reference signal may be transmitted to an uplink through only a partial band not a full system band.

The method may further comprise the step of receiving indication information in the first UE, the indication information indicating that the interference reference signal is transmitted.

The processor may further be configured to receive indication information, which indicates that the interference reference signal is transmitted, by controlling the receiver.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, reliable communication can be performed in a wireless access system that supports FDR.

Secondly, an interference channel between user equipments can be estimated in a wireless access system that supports FDR.

Thirdly, interference between user equipments can be cancelled in a wireless access system that supports FDR, whereby an error of data transmission and reception can be reduced, and data throughput of the user equipments can be increased.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
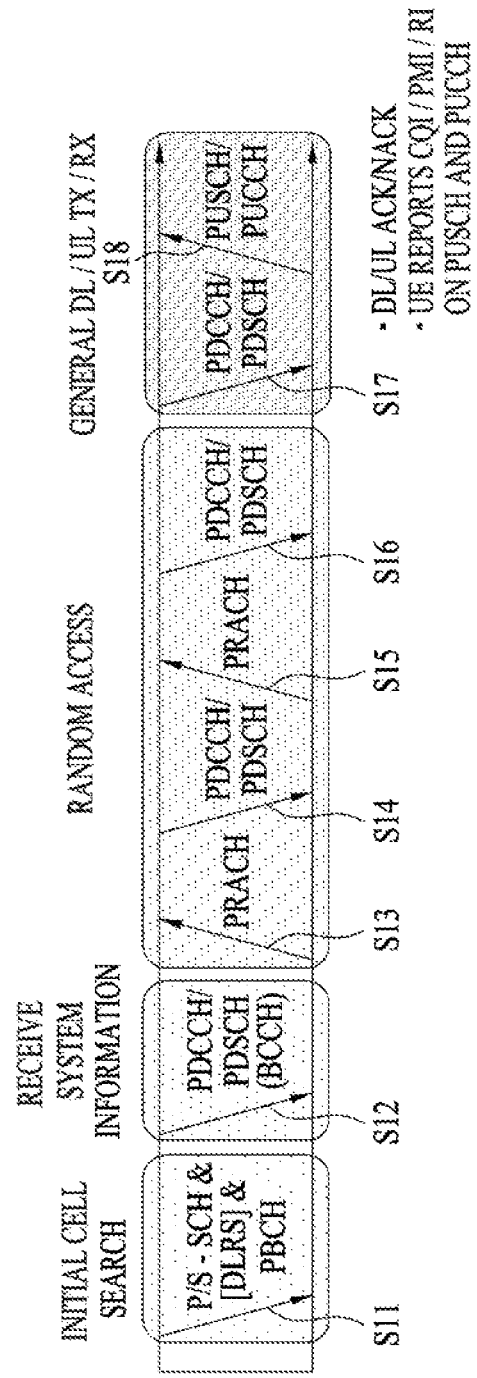
FIG. 1 illustrates physical channels and a general signal transmission method using the physical channels, which may be used in embodiments of the present invention.

The present invention described hereinafter relates to methods and apparatus for cancelling interference between user equipments in a full duplex radio (FDR) system.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
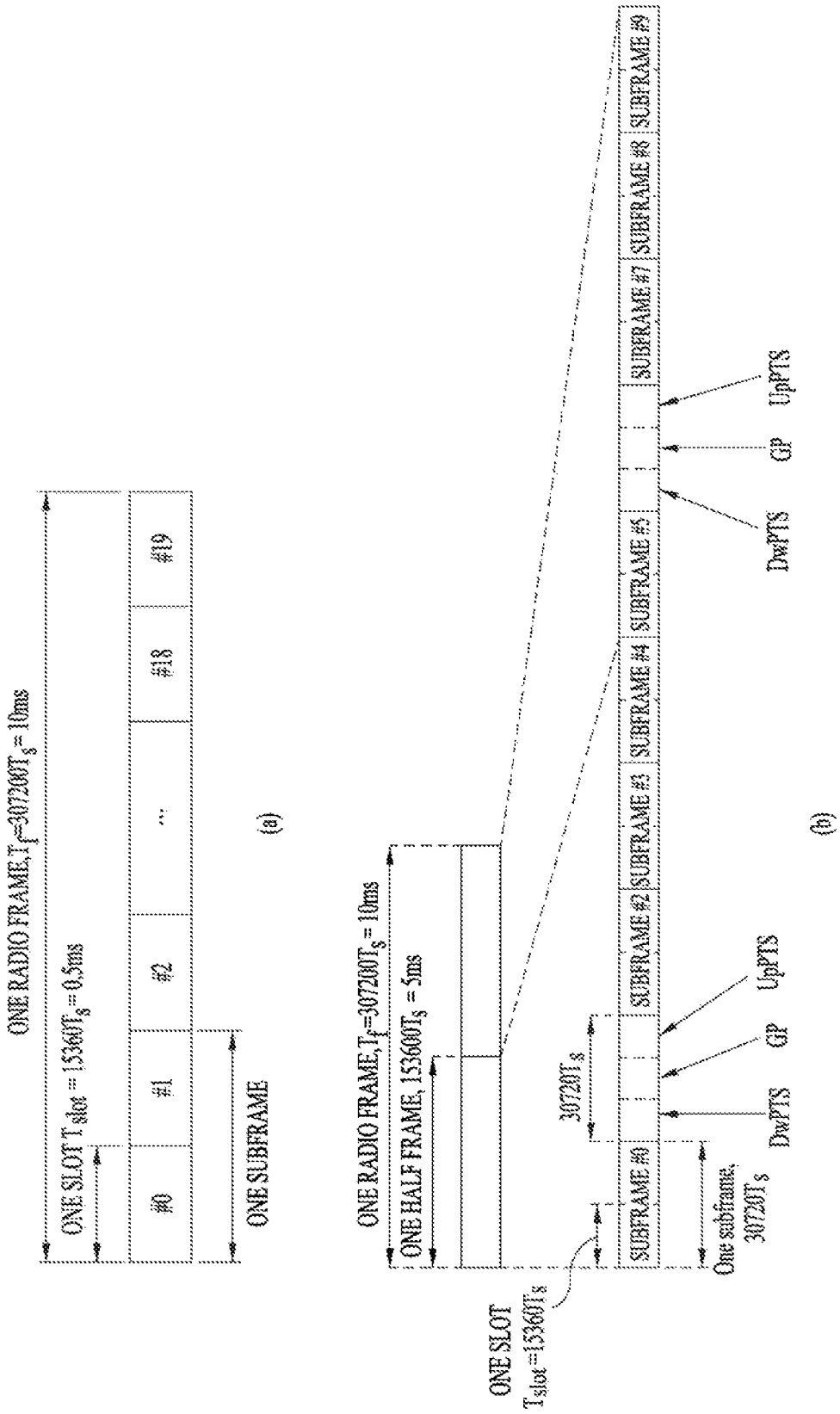
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s = 1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f = 307200 \cdot T_s$) long, including two half-frames each having a length of 5 ms ($= 153600 \cdot T_s$) long. Each half-frame includes five subframes each being 1 ms ($= 30720 \cdot T_s$) long. An $i^{th}$ subframe includes $2i^{th}$ and $(2i+1)^{th}$ slots each having a length of 0.5 ms ($T_{slot} = 15360 \cdot T_s$). $T_s$ is a sampling time given as $T_s = 1/(15 \text{ kHz} \times 2048) = 3.2552 \times 10^{-8}$ (about 33 ns).

Figure 3:
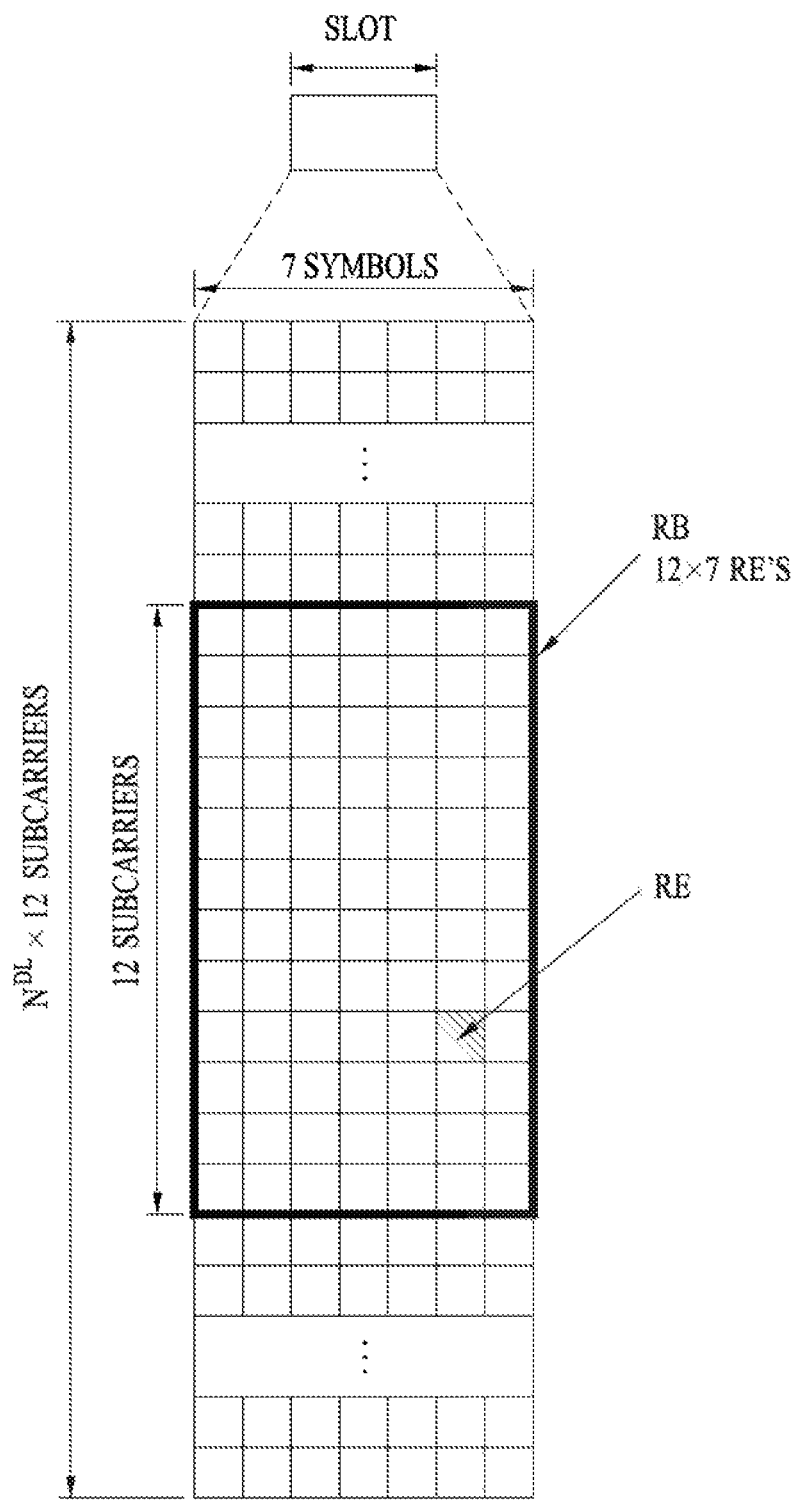
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
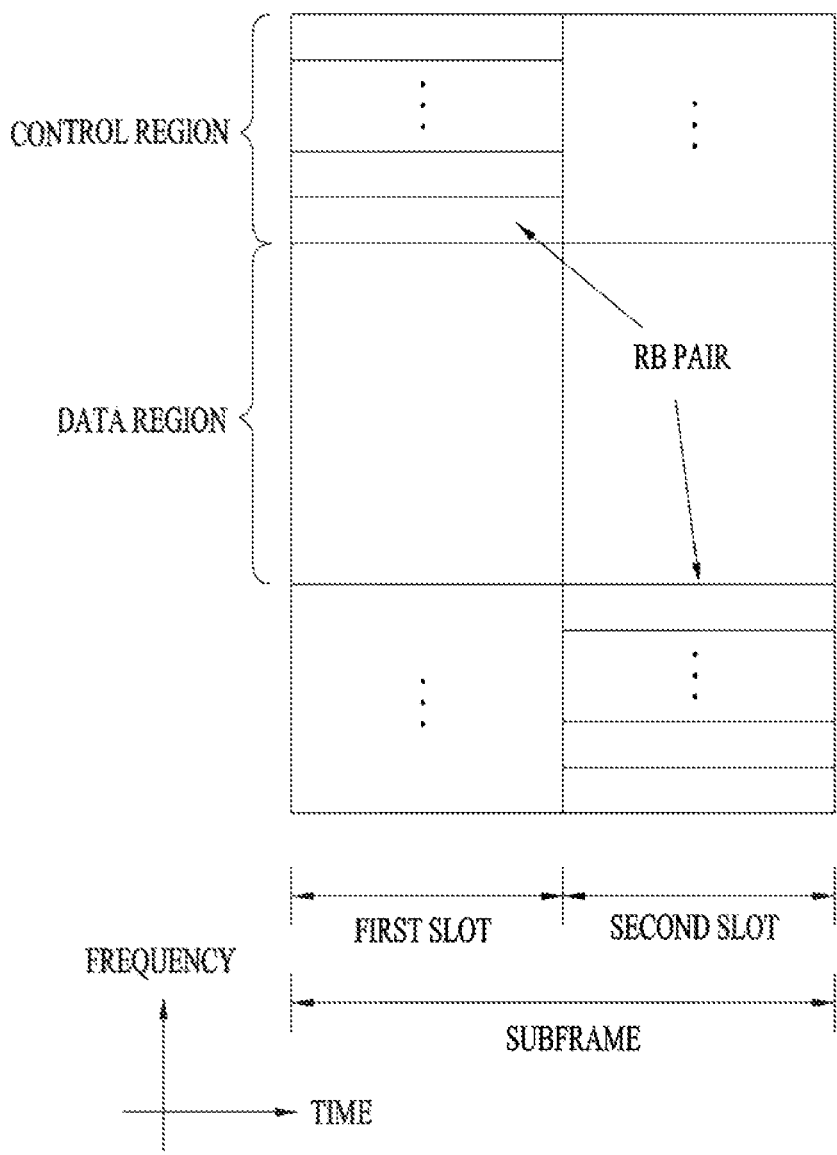
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
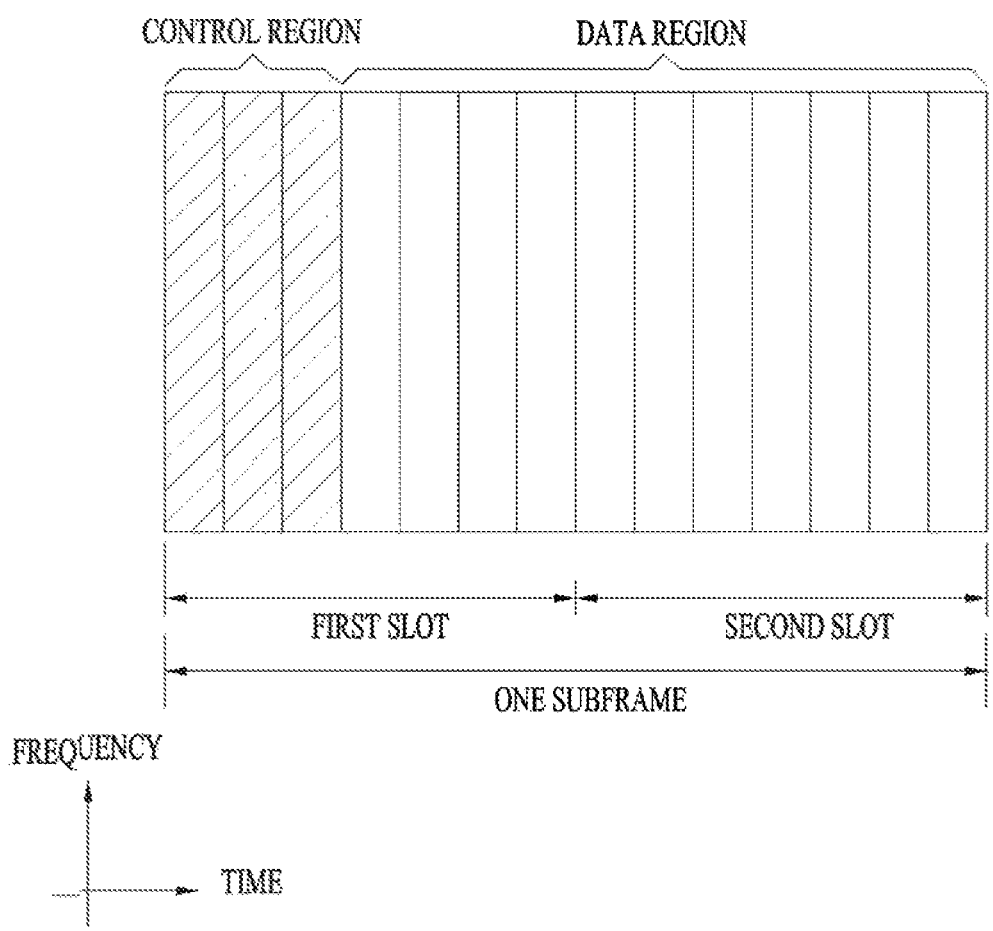
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation.

The term CA is interchangeable with carrier combining, bandwidth aggregation, spectrum aggregation, etc. The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
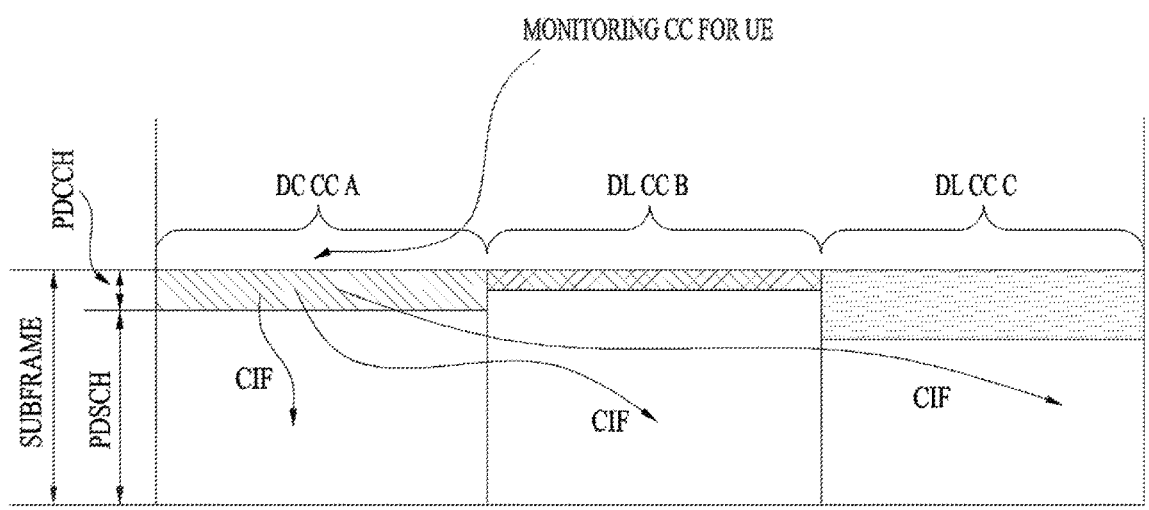
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. FDR System

An FDR system is applicable to the above-described LTE/LTE-A system. That is, all of a frame structure, a control signal transmission and reception method, and support of a CA scheme, defined in the LTE/LTE-A system, may be applied to the FDR system. Hereinafter, an interference cancellation method specific to the FDR system will be described in more detail.

3.1 Interference Cancellation in FDR System

FDR refers to a system that simultaneously supports data transmission and reception using the same resource (i.e., the same time and the same frequency) in one UE. FDR may be a new type of wireless access system. However, in embodiments of the present invention, it is assumed that the FDR system operates based on the LTE/LTE-A system as described in FIGS. 1 to 6.

Figure 7:
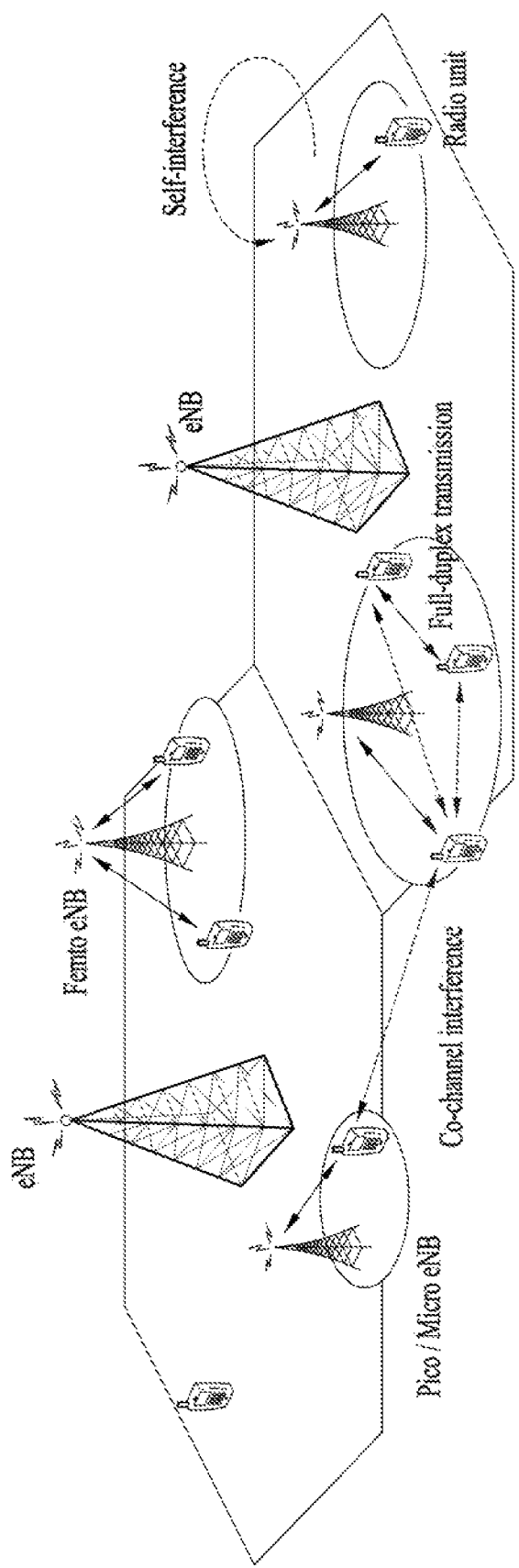
FIG. 7 is a diagram illustrating deployment of an exemplary wireless access system supporting FDR.

FIG. 7 is a diagram illustrating deployment of an exemplary wireless access system supporting FDR.

Referring to FIG. 7, a wireless access system supporting FDR includes a macro eNB managing a normal cell, a small eNB managing a small cell, and a UE (i.e., a wireless unit). The small eNB includes a micro eNB, a femto eNB, a pico eNB, and the like.

In a situation as illustrated in FIG. 7, there may be three types of interference described below.

(1) Intra-Device Interference (IDI)

IDI indicates that a signal transmitted from a transmission antenna of an eNB or a UE is received by a reception antenna, thereby acting as interference due to characteristics of FDR. A signal transmitted from a transmission antenna of a specific device has higher power than a received signal. That is, since a signal transmitted by a transmission antenna of a specific device is received by a reception antenna of the specific device almost without attenuation due to a short distance between the transmission antenna and the reception antenna, the signal transmitted from the transmission antenna of the specific device is received at much higher power than a desired signal that the specific device expects to receive from a peer device.

(2) UE-to-UE Inter-Link Interference

UE-to-UE inter-link interference indicates that a UL signal transmitted by a specific UE is received by another UE adjacent to the specific UE, thereby acting as interference.

(3) BS-to-BS Inter-Link Interference

BS-to-BS inter-link interference indicates that a signal transmitted between eNBs or between heterogeneous eNBs in a Heterogeneous Network (HetNet) situation is received by a reception antenna of another eNB, thereby acting as interference.

From among the above three types of interference, IDI (hereinafter, self-interference) is affected by interference generated only in FDR and should be solved first for FDR management.

Figure 8:
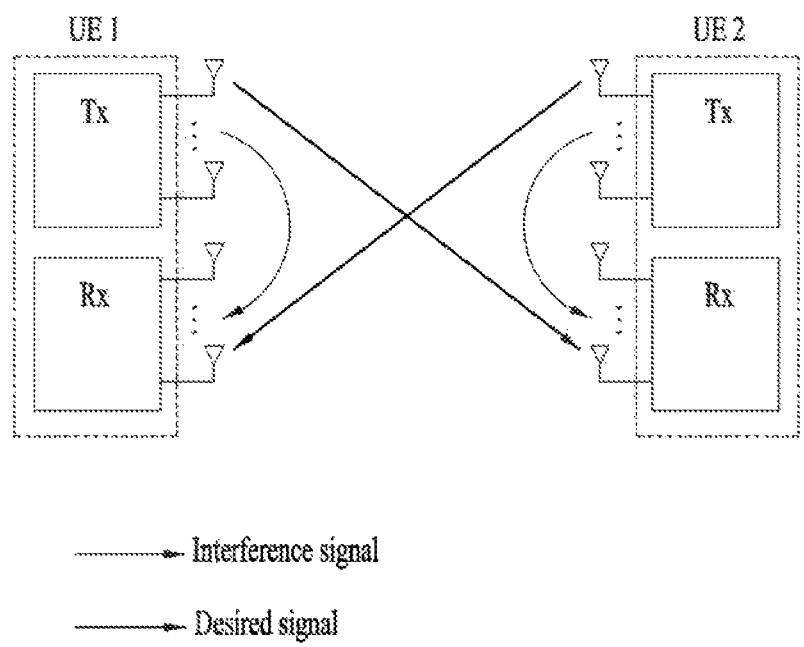
FIG. 8 is a diagram illustrating the concept of self-interference occurring in an FDR system.

FIG. 8 is a diagram illustrating the concept of self-interference occurring in an FDR system.

Although FIG. 8 shows data communication performed between UEs for convenience of description, the present invention is identically applicable to data communication performed between a UE and an eNB.

Referring to FIG. 8, in an FDR environment, a transmission signal transmitted by a transmission antenna of a first UE (i.e., UE1) to a second UE (i.e., UE2) is received by a reception antenna of the first UE, thereby acting as an interference signal. Such self-interference has unique characteristics as opposed to other interference.

First, the first UE may regard a signal causing interference as a perfectly known signal because a self-interference signal received through the reception antenna of the first UE is the transmission signal transmitted by the first UE.

Second, power of the interference signal is remarkably higher than power of a desired signal that the first UE desires to receive because a distance between the transmission antenna and the reception antenna of the first UE is much narrower than a distance between the first UE and the second UE. Due to these characteristics, a receiver is unable to perfectly cancel the interference signal even though a UE is fully aware of the interference signal.

A receiver of a UE may use an Analog-to-Digital Converter (ADC) to convert a received signal into a digital signal. Generally, the ADC measures power of the received signal to adjust a power level of the received signal, quantizes the received signal, and converts the received signal into a digital signal. However, since an interference signal is received by the receiver at a remarkably higher power relative to a desired signal, characteristics of a desired signal are all covered by a quantization level during quantization and thus the receiver may be unable to restore the received signal.

Figure 9:
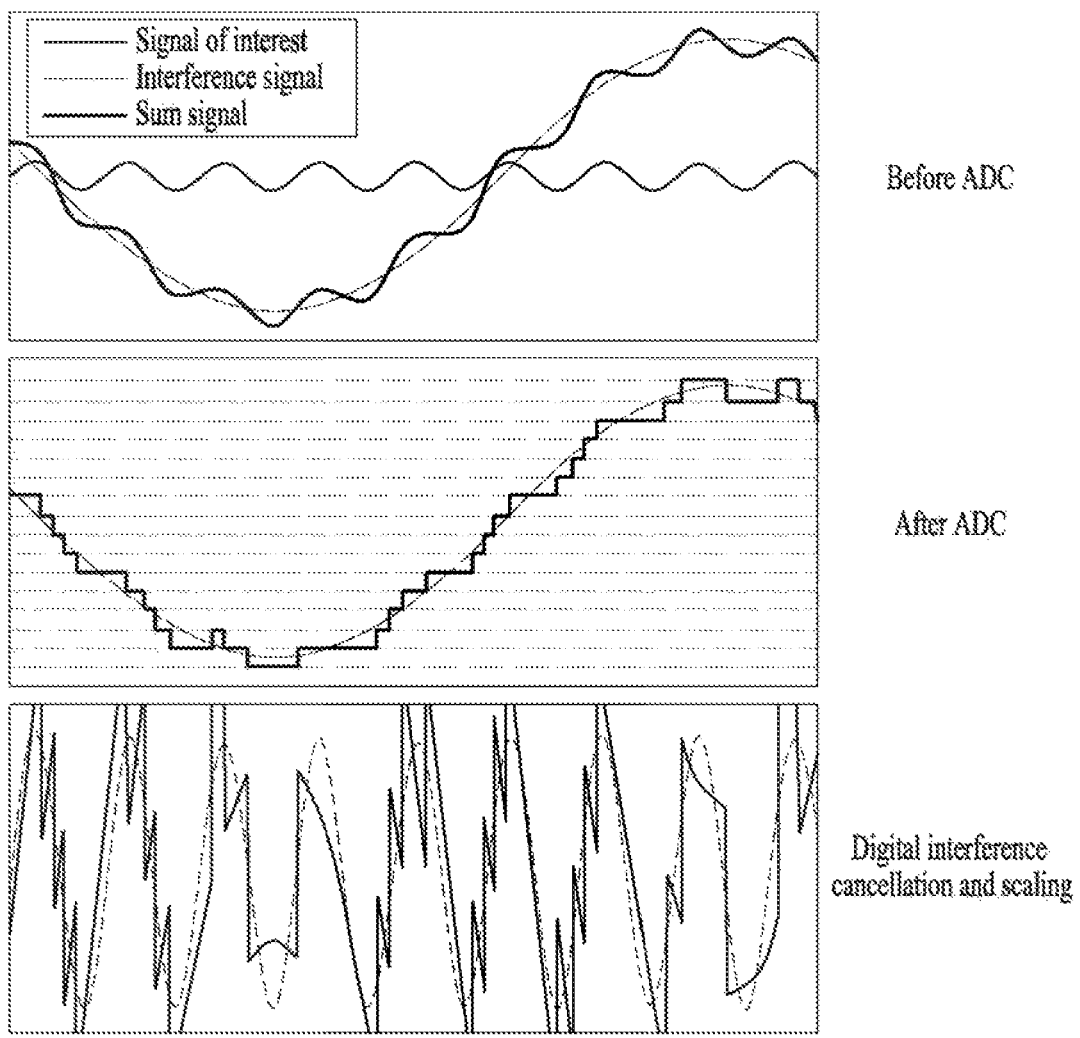
FIG. 9 is a diagram illustrating signal distortion caused by a quantization error when power of an interference signal is higher than power of a desired signal.
Figure 10:
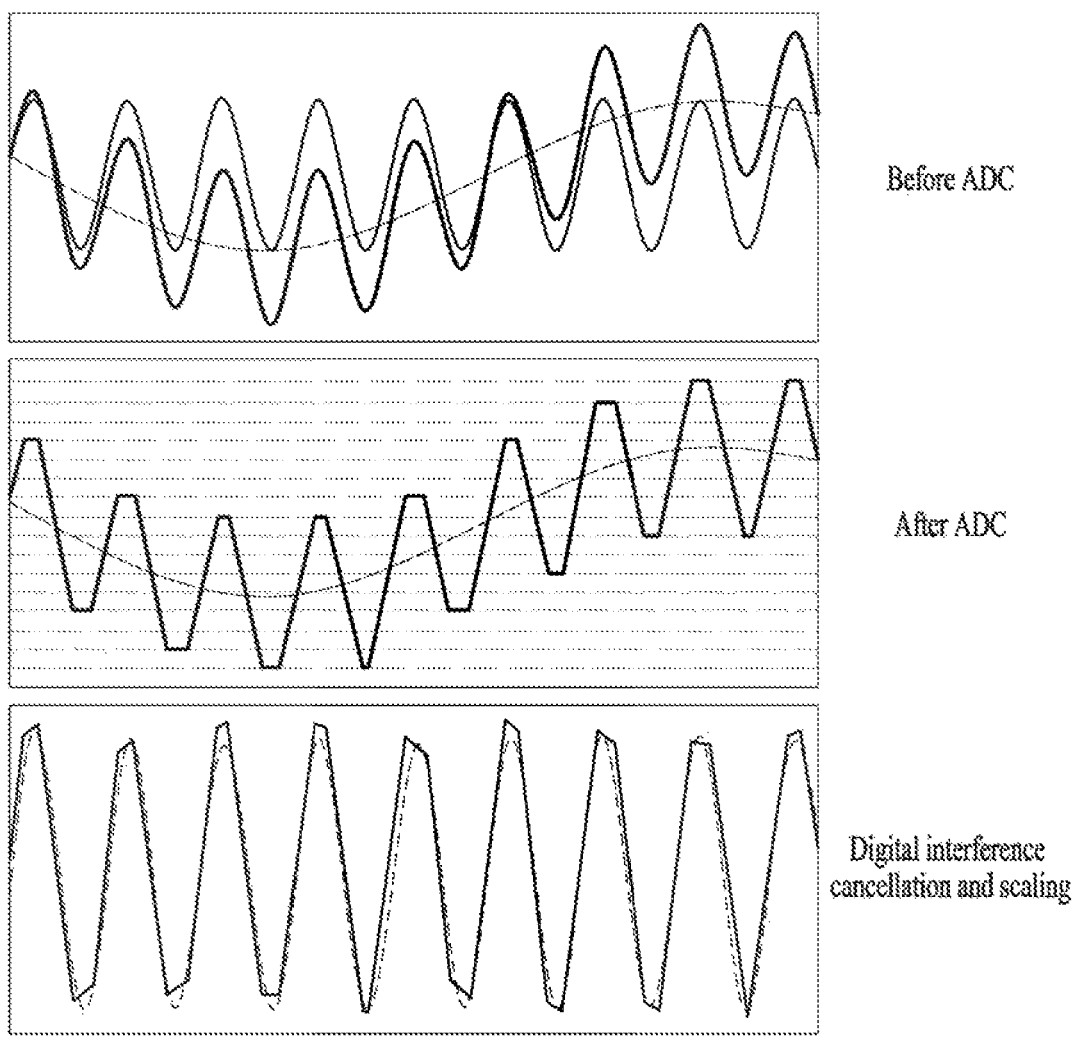
FIG. 10 is a diagram illustrating a signal restoration state when power of an interference signal is lower than power of a desired signal.

FIG. 9 is a diagram illustrating signal distortion caused by a quantization error when power of an interference signal is higher than power of a desired signal and FIG. 10 is a diagram illustrating a signal restoration state when power of an interference signal is lower than power of a desired signal.

As can be seen from FIG. 9, a desired signal is severely distorted even when an interference signal is eliminated in a situation in which the interference signal has remarkably higher power than the desired signal on the assumption that 4-bit quantization is performed. In contrast, FIG. 10 shows that a desired signal is restored after an interference signal is eliminated when the interference signal has lower power than the desired signal.

Figure 11:
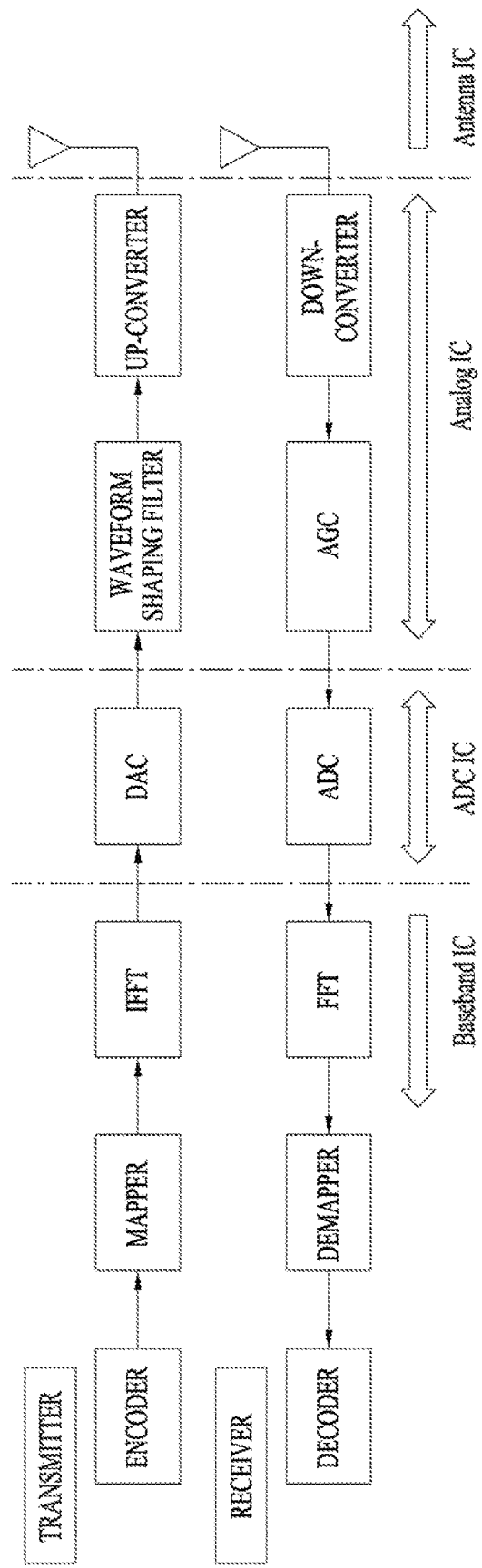
FIG. 11 is a block diagram of a transmitter and a receiver to which schemes for cancelling self-interference are applied.

FIG. 11 is a block diagram of a transmitter and a receiver to which schemes for cancelling self-interference are applied.

Referring to FIG. 11, the transmitter may include an encoder for encoding a data bit, a mapper for mapping the encoded data bit to a physical resource, an Inverse Fast Fourier Transform (IFFT) unit for modulating the data bit to data using an OFDM scheme, a Digital-to Analog Converter (DAC) for modulating a digital signal into an analog signal, a waveform shaping filter for converting the modulated signal into a desired waveform, an up-converter for raising frequency of a signal, and an antenna.

The receiver may include an antenna for receiving a signal, a down converter for lowering a frequency of the received signal, an Automatic Gain Controller (AGC) for automatically controlling an amplification factor so that output of a circuit becomes a predetermined range, an Analog-to-Digital Converter (ADC) for modulating an analog signal into a digital signal, a Fast Fourier Transform (FFT) unit for converting an input signal into data of a frequency domain, a demapper and a decoder for decoding an output signal.

Referring to FIG. 11, antenna Interference Cancellation (IC) is performed in the antennas of the transmitter and the receiver and analog IC is performed in the waveform shaping filter and the up-converter of the transmitter and the AGC and the down-converter of the receiver. ADC IC is performed in the DAC of the transmitter and the ADC of the receiver and baseband IC (or digital IC) is performed in the other parts of the transmitter and the receiver.

Hereinafter, IC schemes performed by each part of the transmitter and the receiver will be described.

3.1.1 Antenna IC

Figure 12:
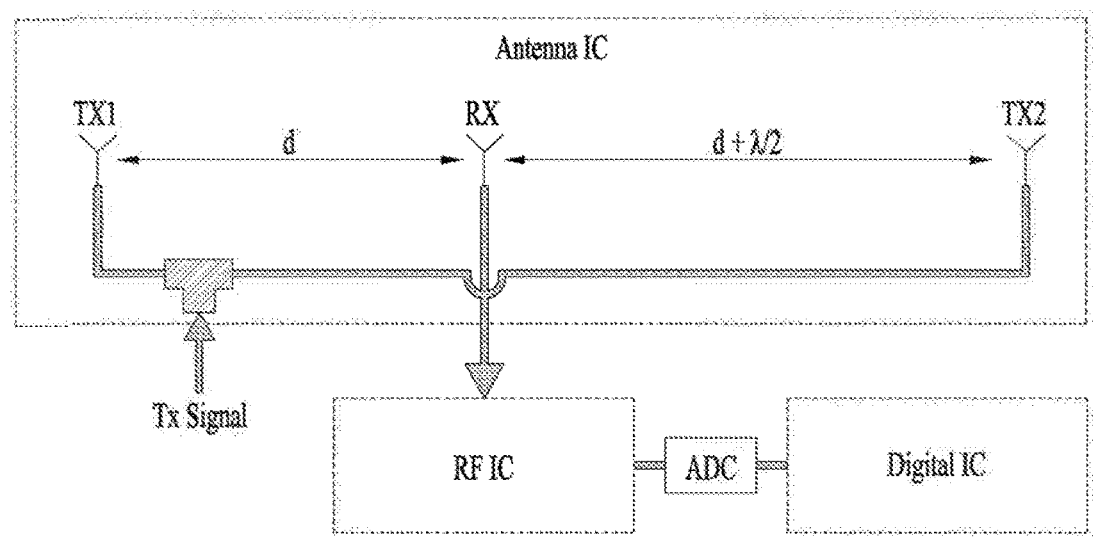
FIG. 12 is a diagram illustrating an exemplary antenna IC scheme using a distance between antennas.

Antenna IC is the simplest IC implementation scheme from among all IC schemes. FIG. 12 is a diagram illustrating an exemplary antenna IC scheme using a distance between antennas and FIG. 13 is a diagram illustrating an exemplary antenna IC scheme using a phase converter.

Referring to FIG. 12, one UE may perform IC using three antennas. In this case, two antennas are used as transmission antennas Tx and one antenna is used as a reception antenna Rx. The two transmission antennas are installed at intervals of a predetermined distance corresponding to about a half wavelength (wavelength/2) based on the reception antenna. This allows a signal transmitted from each transmission antenna to be received as a phase-inverted signal from the viewpoint of the reception antenna. Accordingly, an interference signal from among signals received by the reception antenna converges towards 0.

Figure 13:
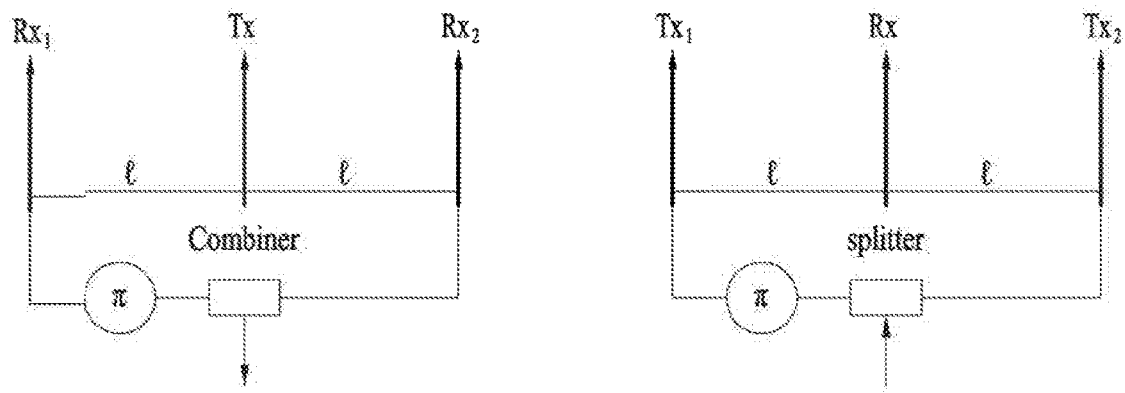
FIG. 13 is a diagram illustrating an exemplary antenna IC scheme using a phase converter.

Referring to FIG. 13, an interference signal may be cancelled using a phase shifter for inverting a phase of the second transmission antenna Tx2 in the same antenna configuration as in FIG. 12. The left drawing of FIG. 13 illustrates antenna deployment for cancelling self-interference using two reception antennas and the right drawing of FIG. 13 illustrates antenna deployment for cancelling interference using two transmission antennas.

Figure 14:
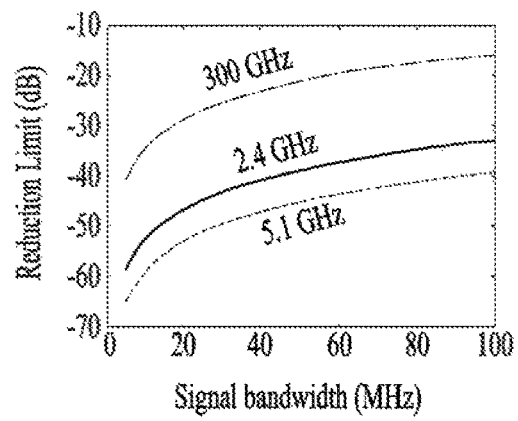
FIG. 14 illustrates IC performance according to bandwidth and center frequency of a signal when an antenna IC scheme is used.

The above antenna IC scheme is affected by bandwidth and center frequency of a transmission signal. That is, as the bandwidth of the transmission signal decreases and as the center frequency of the transmission signal increases, IC performance increases. FIG. 14 illustrates IC performance according to bandwidth and center frequency of a signal when an antenna IC scheme is used.

3.1.2 ADC IC

Even though an interference signal is known to a transmitter, the biggest reason why interference cannot be cancelled is an ADC. Therefore, interference can be cancelled by maximizing ADC performance. However, ADC IC has a difficulty in actual implementation due to limitation of quantization bits of the ADC. Since ADC performance has been gradually improved in recent times, required self-interference cancellation performance may be reduced.

3.1.3 Analog IC

Analog IC is a scheme of cancelling interference prior to ADC IC and cancels self-interference using an analog signal. Analog IC may be performed in an RF region or an Intermediate Frequency (IF) region. The analog IC scheme is performed in a manner of subtracting an interference signal from a signal received by a reception antenna by delaying phase and time of a transmitted analog signal.

The above analog IC scheme has an advantage of requiring only one transmission antenna and only one reception antenna as opposed to the number of antennas in the antenna IC scheme. However, since processing using an analog signal is performed, additional distortion may occur due to implementation complexity and circuit characteristics and thus IC performance may be remarkably changed.

3.1.4 Digital IC (Baseband IC)

Digital IC is a scheme for cancelling interference after ADC IC and includes all IC schemes performed in a baseband region. Digital IC may be performed in a manner of subtracting a transmitted digital signal from a received digital signal.

Alternatively, a UE or an eNB that transmits a signal using multiple antennas may perform beamforming or precoding so that a transmission signal may not be received by a reception antenna. If such schemes are performed on a baseband, the schemes may be categorized as digital IC.

However, digital IC can be performed when a digitally modulated signal is quantized in such a manner of being capable of restoring information about a desired signal. In order to perform digital IC, a magnitude difference in power between an interference signal and the desired signal should be within an ADC range after interference is cancelled using one or more of the IC schemes described in sections 3.1.1 to 3.1.3.

Figure 15:
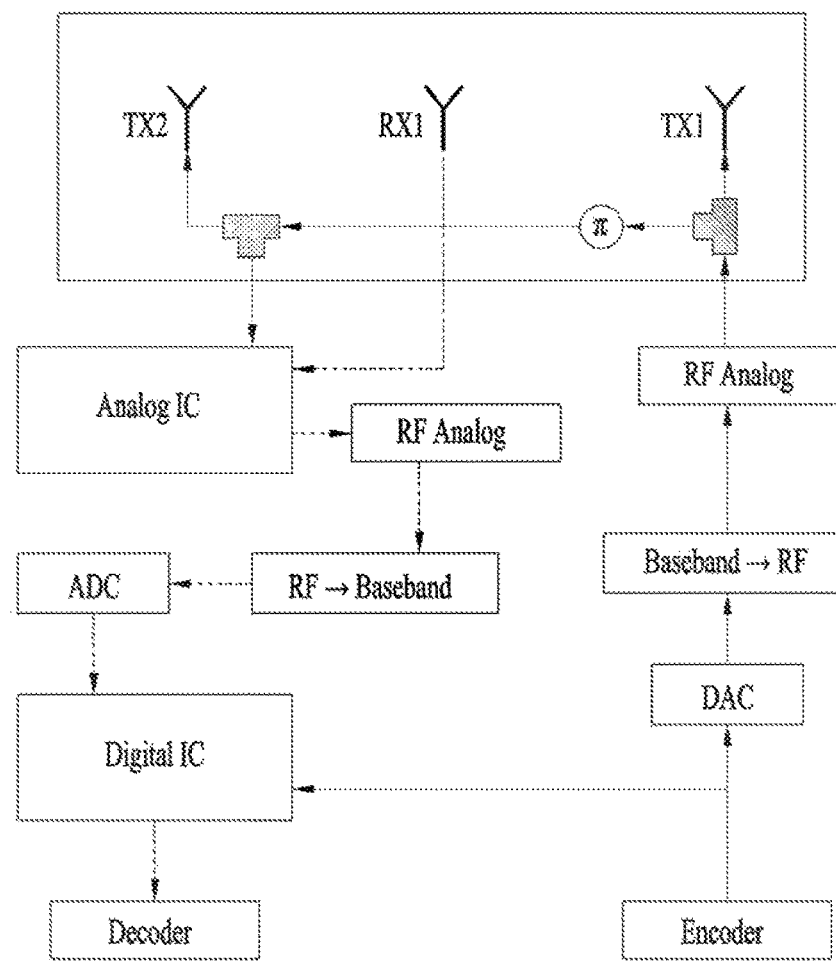
FIG. 15 illustrates a system to which various IC schemes are simultaneously applied.

FIG. 15 illustrates a system to which the IC schemes described in sections 3.1.1 to 3.1.4 are simultaneously applied. Overall IC performance may be improved as IC schemes of respective regions are added.

3.2 Interference Cancellation in MIMO System

The FDR system has been considered in a single input single output (SISO) system. This is because that complexity of self-interference cancellation (SIC) has been rapidly increased in proportion to the number of receiving antennas and the number of transmitting antennas. For example, in order to introduce FDR in a MIMO system (Nt×Nr) that uses N number of transmitting antennas (Nt) and N number of receiving antennas (Nr), a signal output from each transmitting antenna should be removed independently by each receiving antenna, whereby a total of Nt×Nr number of SIC blocks are required.

At this time, the SIC block may be an analog interference cancellation system for canceling an analog signal or a radio frequency (RF) signal or a digital interference cancellation system for canceling a digital signal of a baseband. Alternatively, the SIC block may be an analog-digital interference cancellation system which is a combined system of the analog interference cancellation system and the digital interference cancellation system.

Therefore, in the MIMO system, the number of SIC blocks is increased exponentially in accordance with increase of the number of antennas.

For example, self-interference can be cancelled using one SIC block in case of the legacy SISO system, whereas a total of nine SIC blocks are required to apply FDR to the MIMO system of 3×3.

In this way, in order to apply FDR to the MIMO system, a large number of SIC blocks are required. This may increase hardware complexity of the UE. Also, since each SIC block should perform an adaptation procedure with respect to the UE, adaptation time may be increased or a training period and signal required to perform the adaptation procedure may be increased. Also, performance of the UE may be degraded due to an incorrect adaptation procedure.

3. FDR Channel Property

For FDR operation in the wireless access system, a transceiver should exactly estimate a self-interference (SI) channel. This is because that SI cannot be cancelled exactly if an SI channel estimation error occurs and an interference signal is transmitted at a great power as compared with a desired signal of the transceiver so as not to normally recover the desired signal. Therefore, the present invention suggests estimation methods for exactly estimating a self-interference channel to allow a transceiver to normally recover a desired signal, defining a new RS to reduce resource overhead, and estimating a self-interference channel.

The self-interference channel has the following properties differently from a radio channel between the legacy base station and the UE, a radio channel between base stations, or a radio channel between UEs.

(1) Semi-Static Channel

Since the SI channel means an interference channel between a transmitting antenna and a receiving antenna, which are used in one base station or one UE (see FIG. 8), it is regarded that there is no change in channel property between the transmitting antenna and the receiving antenna. That is, in the legacy radio channel, an environment change occurs due to movement of the UE or time-varying characteristic occurs due to an environment change between a transmitter and a receiver. On the contrary, in case of the SI channel, since it is not likely that positions of the transmitting antenna and the receiving antenna are changed in one apparatus, it is regarded that there is little change in the environment of the SI channel. Therefore, the SI channel may be regarded as a semi-static channel almost having no time-varying characteristic.

(2) 1 Tap Channel

A channel between the transmitting antenna and the receiving antenna, which are used in one base station or UE, is shorter than the legacy radio channel and may be considered as a line of sight (LOS) channel having no obstacle between the transmitting antenna and the receiving antenna except a special case. Due to this property, the SI channel may be assumed as a channel having no multi-path, and may be received at a very lower power than that of a LOS tap that assures a short distance even there is a multi-path therein. Therefore, the SI channel may be considered as a LOS channel and 1 tap channel almost having no multi-path.

The following embodiments of the present invention will be described on the assumption that the SI channel is similar to the aforementioned semi-static property and 1 tap channel property. However, the embodiments of the present invention may be applied to a radio environment where RMS delay or maximum delay is smaller than that of a general multi-path channel without limitation to the semi-static property and the 1 tap channel property.

4. Interference Cancellation Method Between UEs 4.1 Environment where Interference Occurs Between UEs FIG. 16 illustrates an environment that interference between user equipments occurs in an FDR system.

Figure 16:
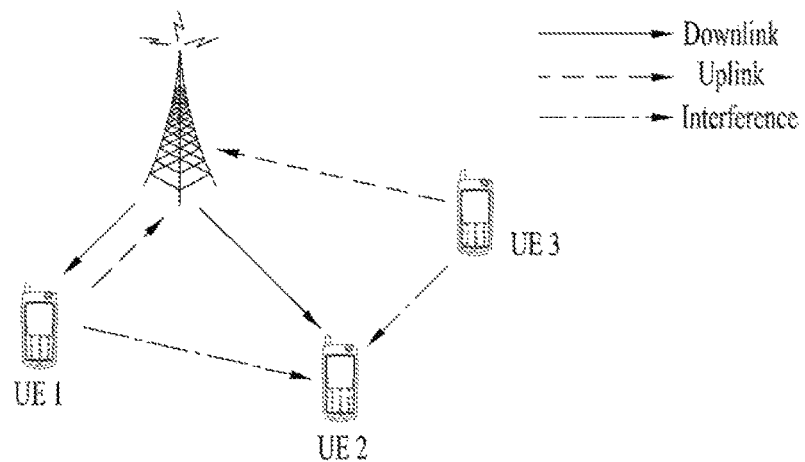
FIG. 16 illustrates an environment that interference between user equipments occurs in an FDR system.

In FIG. 16, a first UE (UE1) means a user equipment that is operated in a FDR communication mode, and second and third UEs (UE2 and UE3) mean user equipments operated in a half-duplex radio (HDR) communication mode. Also, it is assumed that a base station eNB may support both FDR and HDR.

In the FDR system, UEs adjacent to one another may be operated on their respective uplinks/downlinks different from one another, unlike the legacy TDD/FDD. In this case, interference between the UEs may occur. When the first to third UEs are operated on their respective downlinks and uplinks different from one another, the UE2 may be affected by interference due to uplink signals transmitted from the UE1 and the UE3.

In this case, if a plurality of UEs are located within one cell coverage and independently support FDR and/or HDR considering their respective purposes of use, cost and complexity, or if uplink/downlink is managed for each UE considering UL/DL traffic of each UE, interference between the UEs may occur seriously.

In order to avoid such interference, radio resources may be scheduled such that the neighboring UEs may not be operated on their respective uplinks/downlinks different from one another. However, this solution acts as a restriction to traffic control adaptation or optimization based on UL/DL traffic of the UEs, whereby a problem occurs in view of efficiency of the radio resource scheduling. This is because that a specific radio resource cannot be used if interference acting on a UE operated in FDR or HDR is cancelled through scheduling.

Also, this solution acts as a restriction to transmission of a control signal (for example, ACK/NACK signal, dedicated random access message, etc.) which should uniquely be transmitted from each UE at a transmission period, whereby latency may be increased and network miss detection may be caused. Alternatively, to solve the miss detection, there may be a difficulty that a transmission period of the control signal should be set depending on each latency length.

Therefore, the embodiments of the present invention provide various methods for avoiding interference, which may occur due to different uplink/downlink operations between the UEs, instead of interference cancellation through scheduling of the radio resources.

4.2 Interference Cancellation Method Between UEs Through Beamforming

Hereinafter, for convenience of description, UEs that cause interference acting on the second UE, such as the first UE and the second UE of FIG. 16, will be defined as the first UE, and the UE affected by interference will be defined as the second UE. Also, although each of the first UE and the second UE will be described as being assumed as one UE, the first UE and/or the second UE may be a plurality of UEs depending on the communication environment within a cell.

If the UEs within a cell may perform multi-antenna transmission, the UEs, such as the first UE, which transmit uplink signal, may be controlled to transmit the uplink signal by applying beamforming to the uplink signal so as not to transmit the uplink signal to the second UE or so as to reach low signal strength. That is, the first UE may transmit the uplink signal by performing null space projection by acquiring and using information on an interference channel between UEs, whereby the uplink signal may not be transmitted to the second UE.

When an interference channel from the first UE to the second UE is H, a null space projection scheme is performed in such a manner that precoding is performed using a null vector after singular value decomposition (SVD) is performed for the interference channel. To express this as an equation, the SVD is performed for the channel H as follows.

$$H=UDV^H \quad \text{[Equation 1]}$$

In the Equation 1, H means a matrix of M×N. At this time, M means the number of antennas of a transmitting UE (for example, the first UE), and N means the number of antennas of a receiving UE (for example, the second UE). Also, D means a diagonal matrix with non-negative diagonal elements (singular values) in non-ascending order, and U means a unitary matrix of M×M, which contains the left singular vectors, and V means a unitary matrix of N×N, which contains the right singular vectors.

In the Equation 1, to define r as a rank of H and calculate a precoding matrix W for performing null space projection, the right null space of H is used. This may be expressed by the following Equation 2. In this case, r means the number of singular values not zero.

$$W=V(:,r+1:N) \quad \text{[Equation 2]}$$

However, the null space projection scheme means that beamforming is performed to reduce an influence of the interference channel, and cannot assure quality of the uplink signal transmitted from the first UE to the base station.

Therefore, various schemes for selecting a precoding matrix that assures signal quality of an uplink signal and causes less influence of interference may be applied. For example, the schemes may include MMSE (Minimum Mean Square Error), capacity maximization, SINR (Signal to Interference Noise Ratio) maximization, etc., and a scheme such as antenna selection may be performed together with the above schemes to lead to throughput improvement.

4.3 Method for Acquiring Interference Channel Information

Meanwhile, to perform beamforming and the aforementioned methods, information on an interference channel between a UE that causes interference and a UE that is affected by interference should be acquired. If a UE such as the first UE, which causes interference, performs beamforming to cause less interference, the following methods may be performed such that the first UE may acquire the information on the interference channel.

Figure 17:
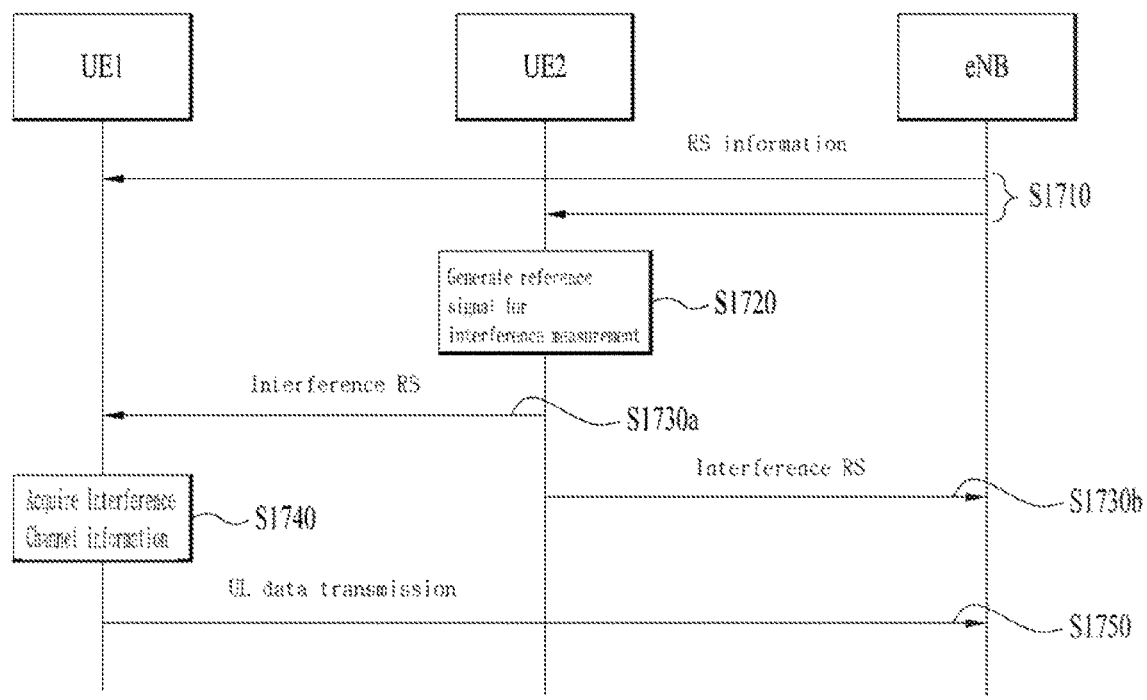
FIG. 17 illustrates one of methods for reducing interference between user equipments by using interference channel information.

FIG. 17 illustrates one of methods for reducing interference between user equipments by using interference channel information.

In FIG. 17, the first UE (i.e., UE1) is a UE that is operated in an FDR or HDR mode, and means a UE that causes interference to another UE. The second UE (i.e., UE2) is a UE that is operated in an FDR or HDR mode, and means a UE that is affected by interference from another UE. In FIG. 17, a case where the UE affected by interference transmits an interference reference signal for interference channel estimation will be described.

Referring to FIG. 17, the base station transmits, to the first UE and the second UE, reference signal (RS) information for configuring an interference reference signal to estimate an interference channel between UEs (S1710).

The second UE generates an interference reference signal for interference measurement on the basis of the reference signal information (S1720).

The second UE may broadcast the generated interference reference signal through an uplink. Alternatively, the second UE may transmit the generated interference reference signal to specific counter parties, that is, the first UE and the base station (S1730a, S1730b).

The first UE that has received the interference reference signal from the second UE may identify that the corresponding interference reference signal is the interference reference signal transmitted to estimate the interference channel between the UEs on the basis of the interference reference signal information received in the step S1710. Therefore, the first UE may acquire information on the interference channel between UEs by using the interference reference signal transmitted from the second UE (S1740).

Afterwards, the first UE may transmit uplink (UL) data to the base station by using the information on the interference channel and the beamforming scheme described in the clause 4.2 (S1750).

Figure 18:
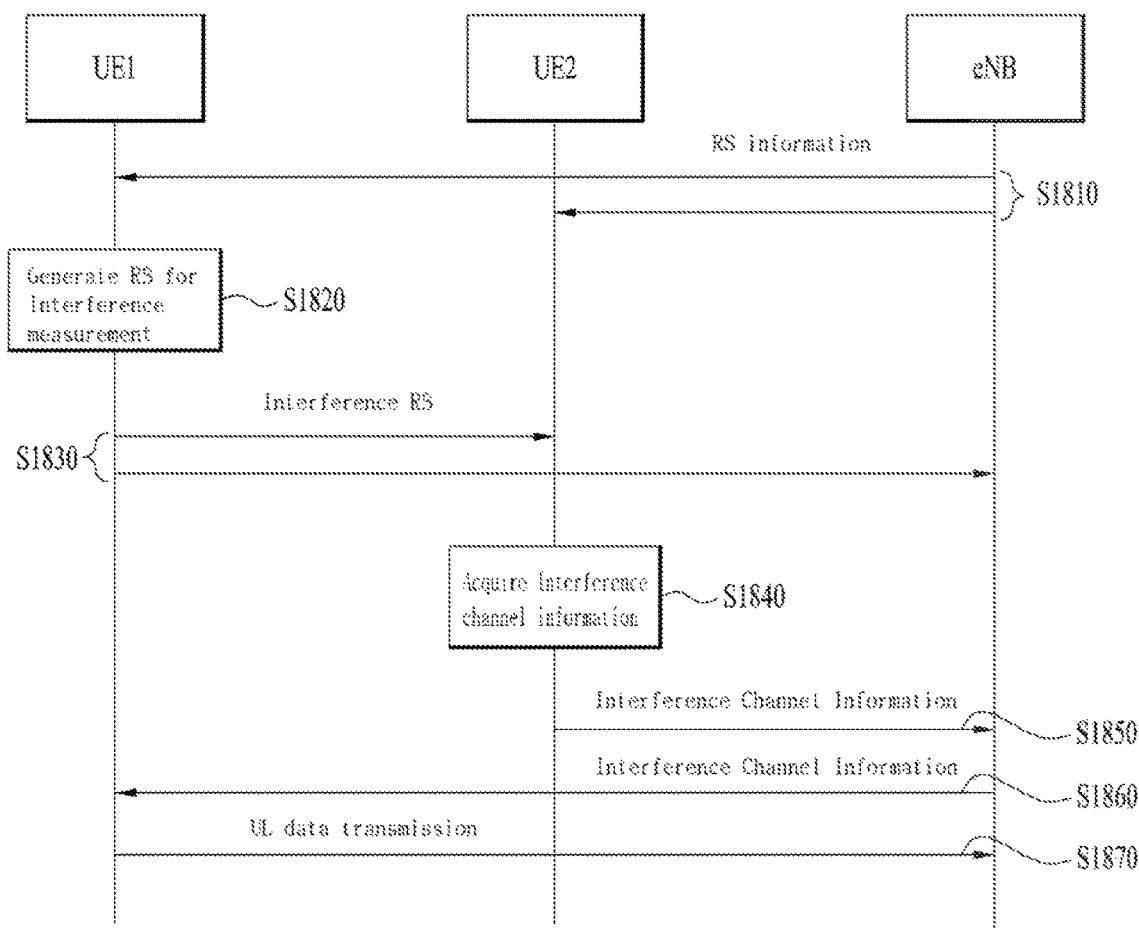
FIG. 18 illustrates another one of methods for reducing interference between user equipments by using interference channel information.

FIG. 18 illustrates another one of methods for reducing interference between UEs by using interference channel information.

In FIG. 18, the first UE (UE1) is a UE that is operated in an FDR or HDR mode, and means a UE that causes interference to another UE. The second UE UE2 is a UE that is operated in an FDR or HDR mode, and means a UE that is affected by interference from another UE. In FIG. 18, a case where the UE that causes interference transmits an interference reference signal for interference channel estimation will be described.

Referring to FIG. 18, the base station transmits, to the first UE and the second UE, reference signal information for configuring an interference reference signal to estimate an interference channel between UEs (S1810).

The first UE generates an interference reference signal for interference measurement on the basis of the reference signal information (S1820).

The first UE may broadcast the generated interference reference signal through an uplink. Alternatively, the first UE may transmit the generated interference reference signal to specific counter parties, that is, the second UE and the base station (S1830).

The second UE that has received the interference reference signal from the first UE may identify that the corresponding interference reference signal is the interference reference signal transmitted to estimate the interference channel between the UEs on the basis of the interference reference signal information received in the step S1810. Therefore, the second UE may acquire information on the interference channel between UEs by using the interference reference signal transmitted from the first UE (S1840).

However, in this case, since the first UE that causes interference cannot identify the interference channel information, the second UE should notify the first UE of the interference channel information on the interference channel. However, since a direct communication environment between UEs is not considered in the present invention, the second UE may transmit the interference channel information to the first UE through the base station. That is, the second UE transmits the interference channel information to the base station, and the base station transmits the received interference channel information to the first UE (S1850, S1860).

If the communication environment between UEs is supported in FIG. 18, the second UE may directly transmit the interference channel information to the first UE without passing through the second base station.

The first UE that has received the interference channel information from the base station may transmit uplink (UL) data to the base station by using the interference channel information on the interference channel and the beamforming scheme described in the clause 4.2 (S1870).

In another aspect of the present invention, although the base station may forward the received interference channel information on the interference channel to the first UE as it is in FIG. 18, the base station may transmit the interference channel information corrected for uplink data transmission which will be performed by the first UE. At this time, the base station may receive the interference reference signal transmitted from the first UE, and the base station may also estimate the interference channel between UEs on the assumption that a channel environment between the base station and the first UE is similar to that between the first UE and the second UE. Therefore, the base station may transmit the corrected interference channel information to the UE by adding the interference channel information acquired by the base station to the interference channel information received from the second UE.

In other aspect of the present invention, in FIGS. 17 and 18, it is assumed that the first UE is operated in FDR mode while the second UE is operated in HDR mode. In this case, the first UE may transmit UL data through a downlink (DL) channel region, and the second UE may receive DL data through the DL channel region. However, if beamforming for interference cancellation between UEs is not performed, UL data transmission of the first UE acts as interference on DL data reception of the second UE. However, through the aforementioned process, the first UE may not transmit UL data to the second UE by performing beamforming during transmission of the UL data, or may transmit the UL data as a very weak signal, whereby interference on the second UE may be reduced.

This method may similarly be applied to even a case where the first UE is operated in HDR mode and the second UE is operated in FDR mode and a case where the first UE and the second UE are operated in FDR mode.

4.5 Configuration of Reference Signal Information

Hereinafter, a method for configuring reference signal information used in the steps S1710 and S1810 will be described. Also, a case where the embodiments of the present invention are applied to the LTE system will be described in this clause.

Information elements constituting the reference signal information may include (1) a type of the reference signal, (2) transmission timing and period of the reference signal, and (3) start point and length of a frequency domain to which the reference signal is transmitted.

An example of the interference reference signal configured based on the reference signal information may include a sounding reference signal (SRS). That is, as the interference reference signal for interference channel estimation between UEs, the SRS used in the 3GPP LTE 8/9/10/11 systems may be used. At this time, the interference reference signal may be transmitted and managed with reference to transmission and management of the SRS. Transmission and management of the SRS may depend on those defined in 3GPP TS 36.211, 3GPP TS 36.212 and 3GPP TS 36.213 specifications.

Also, examples of transmission schemes of the SRS may include periodic/aperiodic transmission schemes depending on the transmission timing. Information for configuring the SRS may include RRC (Radio Resource Control) signals which upper layer signals required for SRS transmission and SRS request field transmitted to a PDCCH. That is, transmission of the reference signal information in the steps S1710 and 1810 means a procedure of transmitting information of a UE, which will transmit the interference reference signal, to another UE which does not transmit the interference reference signal.

As an example of the reference signal information transmitted to estimate the interference channel between UEs, SRS configuration information element (SoundingRS-UL-Config Information element) may be used. In this case, the following Table 2 illustrates an example of a configuration of the reference signal information (that is, SoundingRS-UL-Config information element) included in the SRS configuration information element.

TABLE 2

SoundingRS-UL-interference ::= CHOICE{
   release                     NULL,
   setup                      SEQUENCE {
      srs-Bandwidth            ENUMERATED {bw0, bw1,
                                          bw2, bw3}, TABLE 2-continued

| | |
|---|---|
| srs-HoppingBandwidth | ENUMERATED {hbw0, hbw1, hbw2, hbw3}, |
| freqDomainPosition | INTEGER (0..23), |
| duration | BOOLEAN, |
| srs-ConfigIndex | INTEGER (0..1023), |
| transmissionComb | INTEGER (0..1), |
| cyclic Shift | ENUMERATED {cs0, cs1, cs2, cs3, cs4, cs5, cs6, cs7} |

Referring to Table 2, the reference signal information may include bandwidth information srs-Bandwidth related to a bandwidth to which the interference reference signal will be transmitted, bandwidth hopping information srs-HoppingBandwidth, position information freqDomainPosition indicating a position of the frequency domain, duration information indicating a transmission duration, configuration index information srs-ConfigIndex indicating a type of the reference signal and a configuration of the interference reference signal, transmissionComb information, and cyclic shift information cyclicShift applied to the interference reference signal.

4.6 Restriction of Transmission Position of Reference Signal for Interference Channel Estimation Between UEs Generally, a control channel of a downlink is transmitted to a system bandwidth, and uplink transmission is performed using a part only of a frequency domain due to power consumption of the UE. Therefore, since a part affected by interference is a part of the frequency domain to which an uplink signal is transmitted, it is not required to transmit the interference reference signal to the system bandwidth, and the interference reference signal may be transmitted from the same region as the frequency domain where uplink transmission will be performed.

Generally, SRS transmission is designed to cover a system bandwidth to acquire frequency property of a full band. However, since the reference signal required for interference control between the UEs requires only a part to which uplink signal will be transmitted, this reference signal may not be regarded to be transmitted to the same position as the position to which the SRS is transmitted.

Therefore, in this case, bandwidth information in Table 2 may be reconfigured by being allocated as much as $\lceil \log_2 (N_{RB}^{UL}(N_{RB}^{UL}+1)/2) \rceil$ bits. At this time, $N_{RB}^{UL}$ represents uplink bandwidth configuration expressed by the product of $N_{SC}^{RB}$, and $N_{SC}^{RB}$ means a resource block size of a frequency domain expressed by the number of subcarriers.

4.7 Method for Indicating Interference Reference Signal

Meanwhile, the UE that receives the interference reference signal should know that the interference reference signal for interference channel estimation is transmitted at the corresponding subframe. Therefore, a method for indicating the interference reference signal will be described hereinafter.

Since the SRS is transmitted using the last OFDM symbol at one subframe in the LTE/LTE-A system, the last OFDM signal of a downlink channel corresponding to the corresponding OFDM symbol should be empty, whereby interference channel information for interference channel estimation can be acquired normally. Therefore, a control channel for scheduling corresponding downlink transmission affected by interference should indicate the interference channel information to avoid error operation of a UE which receives a downlink signal.

For example, neighboring UEs transmit the interference reference signal for acquiring the interference channel by adding a 1 bit indicator within control information (that is, DCI) transmitted through a PDCCH, and should acquire that the last or random OFDM symbol of the corresponding subframe is punctured.

Information which will be added into a DCI format within the PDCCH may be as follows.

Adjacent UE SRS transmission indication information—1 bit

DCI that includes adjacent UE SRS transmission indication information may be transmitted from the base station to the first UE after the step S1710 in FIG. 17, and may be transmitted from the base station to the second UE after the step S1810.

Alternatively, an interference reference signal request field indicating that the interference reference signal for interference channel estimation between UEs is transmitted may be used instead of the legacy SRS request field.

For example, if the interference reference signal request field is set to '1', the second UE of FIG. 17 generates the interference reference signal for acquiring the interference channel and the first UE may know that the second UE transmits the interference reference signal. Also, in FIG. 18, the first UE generates the interference reference signal for acquiring the interference channel and the second UE may know that the first UE transmits the interference reference signal.

DCI that includes the interference reference signal request field may be transmitted from the base station to the first UE after the step S1710 in FIG. 17, and may be transmitted from the base station to the second UE after the step S1810.

5. Apparatuses

Figure 19:
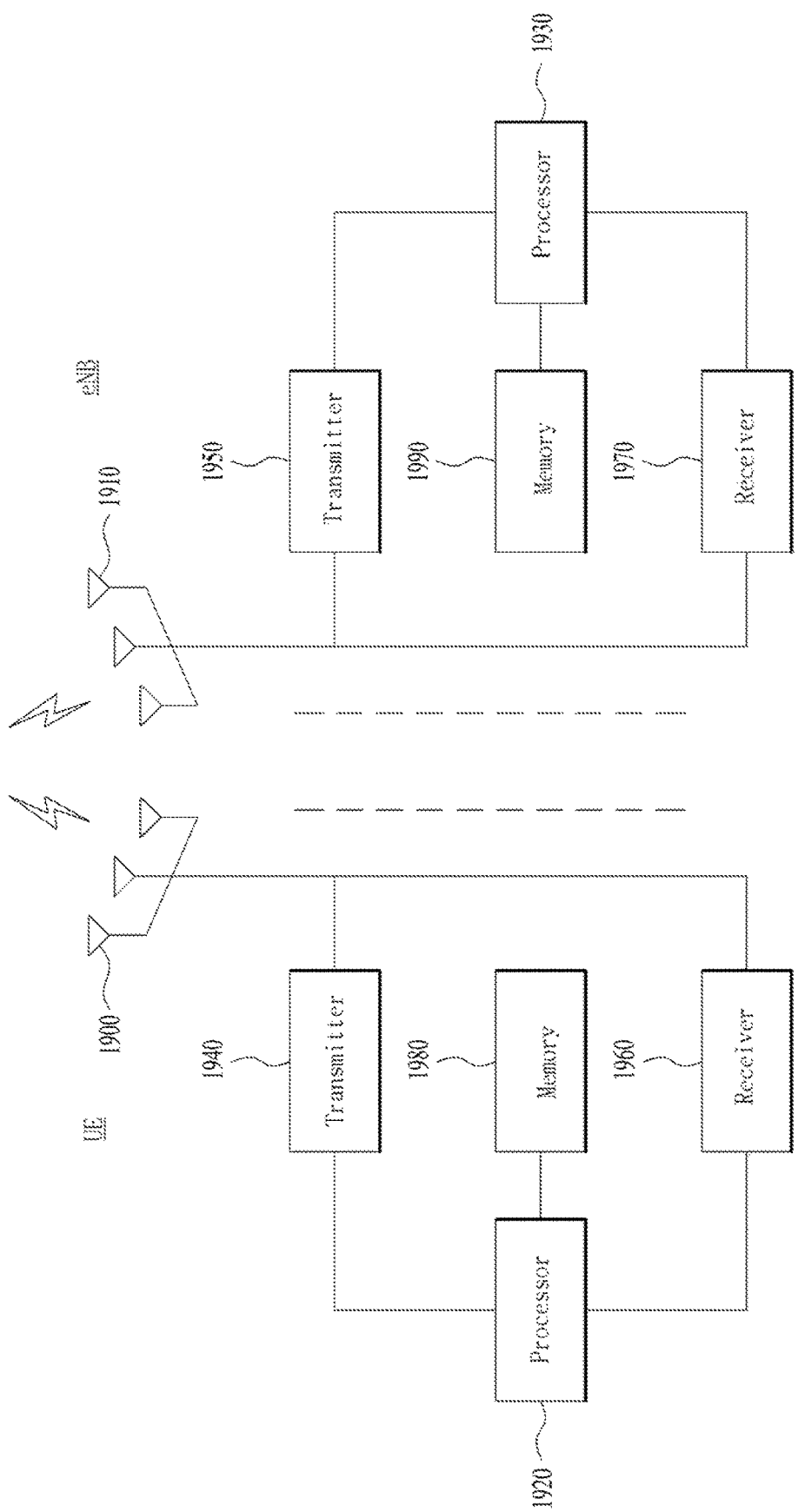
FIG. 19 illustrate an apparatus through which methods described in FIG. 1 to FIG. 18 can be embodied.

Apparatuses illustrated in FIG. 19 are means that can implement the methods described before with reference to FIGS. 1 to 18.

A UE may act as a transmission end on a UL and as a reception end on a DL. An eNB may act as a reception end on a UL and as a transmission end on a DL.

That is, each of the UE and the eNB may include a transmitter (Tx) 1940 or 1950, and a receiver (Rx) 1950 or 1970, for controlling transmission and reception of information, data, and/or messages, and an antenna 1900 or 1910 for transmitting and receiving information, data, and/or messages.

Although the Transmitter and the Receiver are illustrated in FIG. 19 as sharing the antenna, separate antennas may be installed in the Transmitter and the Receiver as illustrated in FIG. 8. In addition, although one antenna is illustrated in each of the UE and the eNB, two or more antennas may be installed in each of the UE and the eNB.

Each of the UE and the eNB may further include a processor 1920 or 1930 for implementing the afore-described embodiments of the present invention and a memory 1980 or 1990 for temporarily or permanently storing operations of the processor 1920 or 1930.

The embodiments of the present invention can be performed using the aforementioned components and functions of the UE and the eNB. For example, the processor of the UE may generate and transceive an interference reference signal for estimation of an interference channel between UEs in an FDR system by means of combination of the methods disclosed in the aforementioned clauses 1 to 4. Also, the processor of the UE may perform beamforming so as not to cause interference to another UE in the interference channel on the basis of interference channel information generated using the interference reference signal.

The Transmitter and the Receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 19 may further include a low-power Radio Frequency (RF)/Intermediate Frequency (IF) module. In this case, the Transmitter and the Receiver may be called a transmitter and a receiver, respectively. If the Transmitter and the Receiver are used together, they may be called a transceiver.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1980 or 1990 and executed by the processor 1940 or 1930. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for cancelling interference in a wireless access system supporting a full-duplex radio (FDR) system, the method comprising:
   receiving, by a first user equipment (UE) from a base station, reference signal information including information for configuring an interference reference signal,
   wherein the information for configuring the interference reference signal is configuration information for a reference signal separately configured for channel interference information between the first UE and a second UE;
   receiving, by the first UE from the base station, downlink control information (DCI) including an interference reference signal request field indicating the interference reference signal for estimating an interference channel between the first UE and the second UE to be transmitted;
   receiving, by the first UE from the second UE, the interference reference signal included in an uplink signal transmitted directly by the second UE;
   acquiring, by the first UE, interference channel information on the interference channel between the first UE and the second UE based on the interference reference signal; and
   transmitting, by the first UE, uplink data to the base station based on the interference channel information by performing beamforming for the uplink data,
   wherein the first UE supports the FDR system and the second UE supports a half-duplex radio (HDR) system,
   wherein the first UE identifies that the interference reference signal is the interference reference signal transmitted directly by the second UE based on the reference signal information, and
   wherein a resource region where the first UE transmits the uplink data corresponds to a resource region where the second UE receives downlink data.

2. The method according to claim 1, wherein the reference signal information includes at least one of type information of the interference reference signal, timing information indicating when the interference reference signal is transmitted, and resource region information on a frequency domain to which the interference reference signal is transmitted.

3. The method according to claim 1, wherein the first UE transmits the uplink data by performing null space projection based on the interference channel information.

4. The method according to claim 1, wherein the interference reference signal is transmitted to an uplink through only a partial band that is not a full system band.

5. The method according to claim 1, claim 4, wherein the partial band is allocated with $\lceil \log_2 (N_{RB}^{UL}(N_{RB}^{UL}+1)/2) \rceil$ bits,
   wherein the $N_{RB}^{UL}$ is an uplink bandwidth configuration expressed by the product of $N_{sc}^{RB}$, and
   wherein the $N_{sc}^{RB}$ is a resource block size of a frequency domain expressed by the number of subcarriers.

6. A first user equipment (UE) for supporting cancellation of interference in a wireless access system supporting a full-duplex radio (FDR) system, the first UE comprising:
   a transmitter;
   a receiver; and a processor configured to support cancellation of interference between the first UE and a second UE by controlling the transmitter and the receiver, wherein the processor is further configured to:
control the receiver to receive, from a base station, reference signal information including information for configuring an interference reference signal, wherein the information for configuring the interference reference signal is configuration information for a reference signal separately configured for channel interference information between the first UE and the second UE, control the receiver to receive, from the base station, receive downlink control information (DCI) including an interference reference signal request field indicating the interference reference signal for estimating an interference channel between the first UE and the second UE to be transmitted, control the receiver to receive the interference reference signal from the second UE included in an uplink signal transmitted directly by the second UE, acquire interference channel information on the interference channel between the first UE and the second UE based on the interference reference signal, and control the transmitter to transmit uplink data to the base station based on the interference channel information by performing beamforming for the uplink data, wherein the first UE supports the FDR system and the second UE supports a half-duplex radio (HDR) system, wherein the first UE identifies that the interference reference signal is the interference reference signal transmitted directly by the second UE based on the reference signal information, and wherein a resource region where the first UE transmits the uplink data corresponds to a resource region where the second UE receives downlink data.

7. The first UE according to claim 6, wherein the reference signal information includes at least one of type information of the interference reference signal, timing information indicating when the interference reference signal is transmitted, and resource region information on a frequency domain to which the interference reference signal is transmitted.

8. The first UE according to claim 6, wherein the first UE transmits the uplink data by performing null space projection based on the interference channel information.

9. The first UE according to claim 6, wherein the interference reference signal is transmitted to an uplink through only a partial band that is not a full system band.

10. The first UE according to claim 6, claim 9, wherein the partial band is allocated with $\lceil \log_2 (N_{RB}^{UL}(N_{RB}^{UL}+1)/2) \rceil$ bits, wherein the $N_{RB}^{UL}$ is an uplink bandwidth configuration expressed by the product of $N_{sc}^{RB}$, and wherein the $N_{sc}^{RB}$ is a resource block size of a frequency domain expressed by the number of subcarriers.

11. The method according to claim 1, wherein the second UE is a second UE which is a peer entity of the first UE.

12. The first UE according to claim 6, wherein the second UE is a second UE which is a peer entity of the first UE.

* * * * *